United States Patent
Shi et al.

(10) Patent No.: US 11,989,624 B1
(45) Date of Patent: May 21, 2024

(54) METHOD AND APPARATUS FOR OPTIMIZING A QUBIT CONTROL SIGNAL, AND QUANTUM COMPUTER

(71) Applicant: ORIGIN QUANTUM COMPUTING TECHNOLOGY (HEFEI) CO., LTD., Anhui (CN)

(72) Inventors: Hanqing Shi, Anhui (CN); Weicheng Kong, Anhui (CN)

(73) Assignee: ORIGIN QUANTUM COMPUTING TECHNOLOGY (HEFEI) CO., LTD., Anhui (CN)

( * ) Notice: Subject to any disclaimer, the term of this patent is extended or adjusted under 35 U.S.C. 154(b) by 0 days.

(21) Appl. No.: 18/500,040

(22) Filed: Nov. 1, 2023

Related U.S. Application Data

(63) Continuation of application No. PCT/CN2022/108075, filed on Jul. 27, 2022.

(30) Foreign Application Priority Data

Jul. 28, 2021 (CN) .......................... 202110855265.X

(51) Int. Cl.
*G06N 10/40* (2022.01)
*G06N 10/20* (2022.01)

(52) U.S. Cl.
CPC .............. *G06N 10/40* (2022.01); *G06N 10/20* (2022.01)

(58) Field of Classification Search
CPC ....................................... G06F 10/40
USPC ......................................... 716/136
See application file for complete search history.

(56) References Cited

U.S. PATENT DOCUMENTS

2018/0260732 A1\* 9/2018 Bloom .................. G06N 10/40
2021/0116784 A1    4/2021 Sutherland

FOREIGN PATENT DOCUMENTS

| CN | 108415206 A | 8/2018 |
| CN | 207882951 U | 9/2018 |
| CN | 109406875 A | 3/2019 |
| CN | 112444714 A | 3/2021 |
| CN | 113011594 A | 6/2021 |
| WO | 2020106312 A1 | 5/2020 |

OTHER PUBLICATIONS

ISA China National Intellectual Property Administration, International Search Report Issued in Application No. PCT/CN2022/108075, Oct. 27, 2022, WIPO, 8 pages. (Submitted with Partial English Translation).

\* cited by examiner

*Primary Examiner* — Eric D Lee
(74) *Attorney, Agent, or Firm* — McCoy Russell LLP

(57) ABSTRACT

The present disclosure discloses a method and apparatus for optimizing a qubit control signal, and a quantum computer. The method includes: obtaining an operating frequency of a qubit based on a Ramsey experiment; obtaining a detuning amount of a frequency of the qubit control signal based on an amplified phase error (APE) experiment, where the APE experiment is an experiment that measures a change in quantum state information of the qubit with a preset detuning amount of the frequency of the qubit control signal; and optimizing the qubit control signal based on the detuning amount of the frequency.

11 Claims, 7 Drawing Sheets

| N=5 | | N=6 | | N=7 | |
|---|---|---|---|---|---|
| Preset detuning amount (GHz) | Quantum state information | Preset detuning amount (GHz) | Quantum state information | Preset detuning amount (GHz) | Quantum state information |
| -0.03 | 0.171 | -0.03 | 0.704 | -0.03 | 0.889 |
| -0.029 | 0.153 | -0.029 | 0.465 | -0.029 | 0.948 |
| -0.028 | 0.214 | -0.028 | 0.283 | -0.028 | 0.805 |
| -0.027 | 0.358 | -0.027 | 0.151 | -0.027 | 0.565 |
| -0.026 | 0.557 | -0.026 | 0.172 | -0.026 | 0.31 |
| -0.025 | 0.781 | -0.025 | 0.306 | -0.025 | 0.138 |
| -0.024 | 0.91 | -0.024 | 0.555 | -0.024 | 0.18 |
| -0.023 | 0.955 | -0.023 | 0.788 | -0.023 | 0.353 |
| -0.022 | 0.875 | -0.022 | 0.933 | -0.022 | 0.665 |
| -0.021 | 0.66 | -0.021 | 0.936 | -0.021 | 0.875 |
| -0.02 | 0.464 | -0.02 | 0.769 | -0.02 | 0.942 |
| -0.019 | 0.224 | -0.019 | 0.463 | -0.019 | 0.731 |
| -0.018 | 0.113 | -0.018 | 0.245 | -0.018 | 0.435 |
| -0.017 | 0.134 | -0.017 | 0.129 | -0.017 | 0.167 |
| -0.016 | 0.282 | -0.016 | 0.199 | -0.016 | 0.12 |
| -0.015 | 0.539 | -0.015 | 0.439 | -0.015 | 0.349 |
| -0.014 | 0.779 | -0.014 | 0.702 | -0.014 | 0.642 |
| -0.013 | 0.915 | -0.013 | 0.893 | -0.013 | 0.889 |
| -0.012 | 0.912 | -0.012 | 0.909 | -0.012 | 0.897 |
| -0.011 | 0.76 | -0.011 | 0.683 | -0.011 | 0.622 |
| -0.01 | 0.502 | -0.01 | 0.387 | -0.01 | 0.332 |
| -0.009 | 0.271 | -0.009 | 0.165 | -0.009 | 0.14 |
| -0.008 | 0.141 | -0.008 | 0.122 | -0.008 | 0.198 |
| -0.007 | 0.126 | -0.007 | 0.289 | -0.007 | 0.504 |
| -0.006 | 0.308 | -0.006 | 0.58 | -0.006 | 0.853 |
| -0.005 | 0.545 | -0.005 | 0.832 | -0.005 | 0.942 |
| -0.004 | 0.779 | -0.004 | 0.945 | -0.004 | 0.798 |
| -0.003 | 0.925 | -0.003 | 0.845 | -0.003 | 0.456 |
| -0.002 | 0.926 | -0.002 | 0.599 | -0.002 | 0.182 |
| -0.001 | 0.778 | -0.001 | 0.336 | -0.001 | 0.121 |
| 0 | 0.556 | 0 | 0.122 | 0 | 0.34 |

FIG. 3

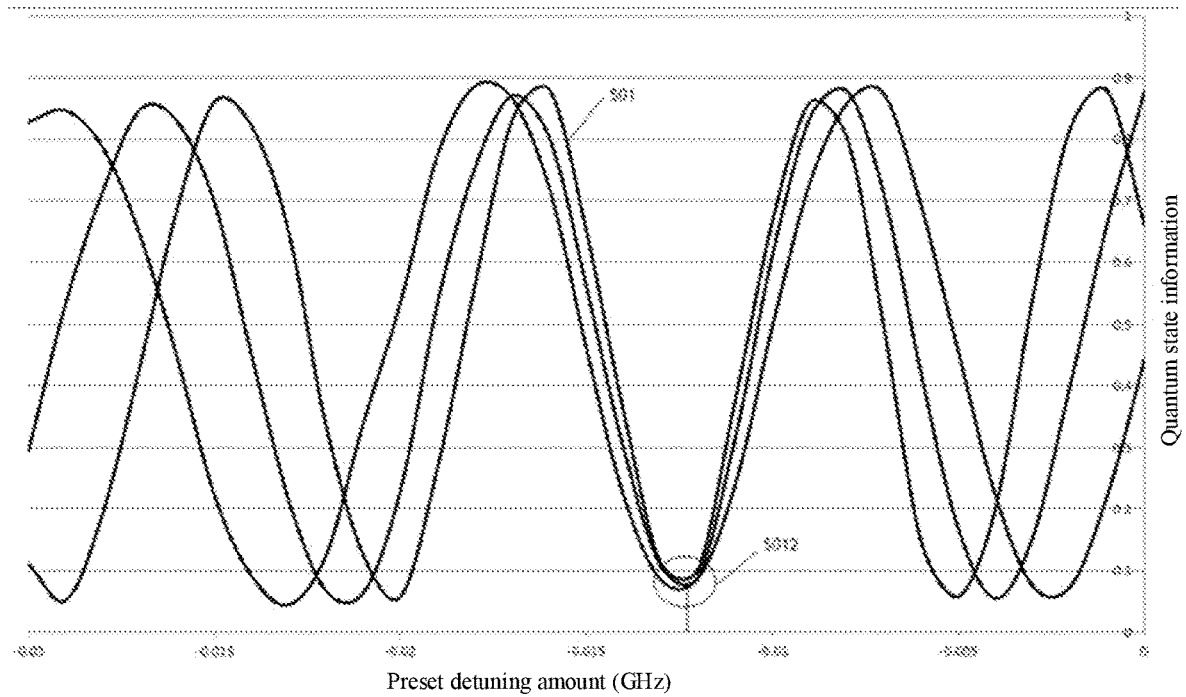

FIG. 6

Respectively fit the plurality of first data when the current N pairs of qubit control signals act on the qubit to obtain a plurality of first curves corresponding to the plurality of first data — S2031

Obtain a preset detuning amount corresponding to an overlapping point of troughs of the plurality of first curves, where the preset detuning amount is the detuning amount of the frequency — S2032

FIG. 7

METHOD AND APPARATUS FOR OPTIMIZING A QUBIT CONTROL SIGNAL, AND QUANTUM COMPUTER

CROSS-REFERENCE TO RELATED APPLICATIONS

This application a continuation of International Application No. PCT/CN2022/108075, filed on Jul. 27, 2022, which claims priority to Chinese Patent Application No. 202110855265.X filed with the China Patent Office on Jul. 28, 2021, both of which are hereby expressly incorporated by reference into the present application.

TECHNICAL FIELD

The present disclosure relates to the field of quantum computing, and in particular, to a method and apparatus for optimizing a qubit control signal, and a quantum computer.

BACKGROUND

In the related art, as a chip, a quantum chip is a basic component unit of a quantum computer, and is a processor based on a superposition effect of quantum states and using qubits as a carrier of information processing. A plurality of qubits are integrated on the quantum chip. In order to achieve more complex quantum computing, the number of qubits on the quantum chip is rapidly increasing.

A control signal corresponding to a quantum computing task is applied to the qubits, the qubits are caused to run the quantum computing task, and an execution result of the computing task is obtained by measuring quantum state information of the qubits. Fidelity of the control signal may directly affect accuracy of a result of the computing task. The fidelity of the control signal is affected by parameters such as a frequency, an amplitude, and a phase, so the fidelity of the control signal in the related art is relatively low.

SUMMARY

An objective of the present disclosure is to provide a method and apparatus for optimizing a qubit control signal, and a quantum computer, so as to solve the deficiencies in the related art and improve fidelity of the qubit control signal.

The technical solutions of the present disclosure are as follows.

In an aspect of the present disclosure, a method for optimizing a qubit control signal is provided, and the method includes: obtaining an operating frequency of a qubit based on a Ramsey experiment; and obtaining a detuning amount of a frequency of the qubit control signal based on an amplified phase error (APE) experiment, where the APE experiment is an experiment that measures a change in quantum state information of the qubit with a preset detuning amount of the frequency of the qubit control signal, and the frequency of the qubit control signal is set according to the operating frequency of the qubit; and optimizing the qubit control signal based on the detuning amount of the frequency.

In some embodiments, prior to the obtaining an operating frequency of a qubit based on a Ramsey experiment, the method includes: updating a predetermined quantum state criterion, where the quantum state criterion is used to determine the quantum state information of the qubit.

In some embodiments, the obtaining a detuning amount of a frequency of the qubit control signal based on an APE experiment includes: determining N pairs of qubit control signals according to the operating frequency, where any pair of qubit control signals causes the quantum state information to change from a first quantum state to a second quantum state along a preset path and change from the second quantum state to the first quantum state along the preset path, and N is a positive integer; determining a first scanning range and a first scanning step size of the preset detuning amount, updating frequencies of the N pairs of qubit control signals according to the first scanning range and the first scanning step size, and applying the updated N pairs of qubit control signals to the qubit to obtain first data regarding the change in the quantum state information with the preset detuning amount when the current N pairs of qubit control signals act; and obtaining the detuning amount of the frequency based on the plurality first data.

In some embodiments, the quantum state information is a probability that the qubit is in a ground state, and the obtaining the detuning amount of the frequency based on the plurality of first data includes: respectively fitting the plurality of first data when the current N pairs of qubit control signals act on the qubit to obtain corresponding a plurality of first curves; and obtaining a preset detuning amount corresponding to an overlapping point of peaks of the plurality of first curves, where the preset detuning amount is the detuning amount of the frequency.

In some embodiments, the quantum state information is a probability that the qubit is in an excited state, and the obtaining the detuning amount of the frequency based on the plurality of first data includes: respectively fitting the plurality of first data when the current N pairs of qubit control signals act on the qubit to obtain corresponding a plurality of first curves; and obtaining a preset detuning amount corresponding to an overlapping point of troughs of the plurality of first curves, wherein the preset detuning amount is the detuning amount of the frequency.

In some embodiments, the obtaining a detuning amount of a frequency of the qubit control signal based on an APE experiment further includes: updating the first scanning range of the preset detuning amount, where the updated first scanning range is smaller than the first scanning range prior to the updating.

In another aspect of the present disclosure, a method for optimizing a single-bit quantum logic gate is provided. The single-bit quantum logic gate includes a $\pi$ gate, and the method includes: obtaining an operating frequency of a qubit based on a Ramsey experiment; obtaining a detuning amount of a frequency of the $\pi$ gate based on an APE experiment, where the APE experiment is an experiment that measures the change in quantum state information of the qubit with a preset detuning amount of the frequency of the $\pi$ gate, and the frequency of the $\pi$ gate is set according to the operating frequency of the qubit; determining the frequency of the $\pi$ gate based on the detuning amount of the frequency; optimizing an amplitude of the 7C gate based on an AMP experiment, where the AMP experiment is an experiment that measures a change in the quantum state information of the qubit with the amplitude of the $\pi$ gate.

In some embodiments, the optimizing an amplitude of the $\pi$ gate based on an AMP experiment includes: determining a to-be-applied qubit control signal of N $\pi$ gates, where N is an odd number; and determining a second scanning range of the amplitude of the $\pi$ gate, updating the qubit control signal according to the second scanning range, and applying the updated qubit control signal to the qubit to obtain a second curve of a change in the quantum state information with the amplitude of the π gate.

In yet another aspect of the present disclosure, an apparatus for optimizing a qubit control signal is provided. The apparatus includes a first measurement module, a second measurement module, and an optimization module.

The first measurement module is configured to obtain an operating frequency of a qubit based on a Ramsey experiment. The second measurement module is configured to obtain a detuning amount of a frequency of the qubit control signal based on an APE experiment, where the APE experiment is an experiment that measures the change in quantum state information of the qubit with a preset detuning amount of the frequency of the qubit control signal, and the frequency of the qubit control signal is set according to the operating frequency of the qubit. The optimization module is configured to optimize the qubit control signal based on the detuning amount of the frequency.

In still another aspect of the present disclosure, a quantum computer is provided. A qubit control signal of the quantum computer is optimized using the above method for optimizing a qubit control signal, or the quantum computer includes the above apparatus for optimizing a qubit control signal.

Compared with the related art, the method in the present disclosure includes: obtaining an operating frequency of a qubit based on a Ramsey experiment; obtaining a detuning amount of a frequency of the qubit control signal based on an APE experiment, where the APE experiment is an experiment that measures the change in quantum state information of the qubit with a preset detuning amount of the frequency of the qubit control signal; and obtaining, from a result of the APE experiment, a detuning amount of the frequency of the qubit control signal corresponding to the most accurate quantum state information of the qubit, and optimizing the frequency of the qubit control signal based on the detuning amount of the frequency, so that fidelity of the qubit control signal is greatly improved.

BRIEF DESCRIPTION OF DRAWINGS

FIG. 3 is a table showing a plurality of sets of first data corresponding to a plurality of N values according to some embodiments of the present disclosure;

FIG. 6 is another schematic diagram of first curves obtained by fitting based on the plurality of first data according to some embodiments of the present disclosure;

FIG. 7 is another flowchart of obtaining the detuning amount of the frequency based on a plurality of first data according to some embodiments of the present disclosure;

Reference signs: 10: first measurement module, 20: second measurement module, 30: optimization module, 501: first curve, 5011: overlapping point of peaks; 5012: overlapping point of troughs.

DESCRIPTION OF EMBODIMENTS

Some embodiments described below with reference to the accompanying drawings are exemplary, which are only used to explain the present disclosure and cannot be construed as limiting the present disclosure.

Figure 1:
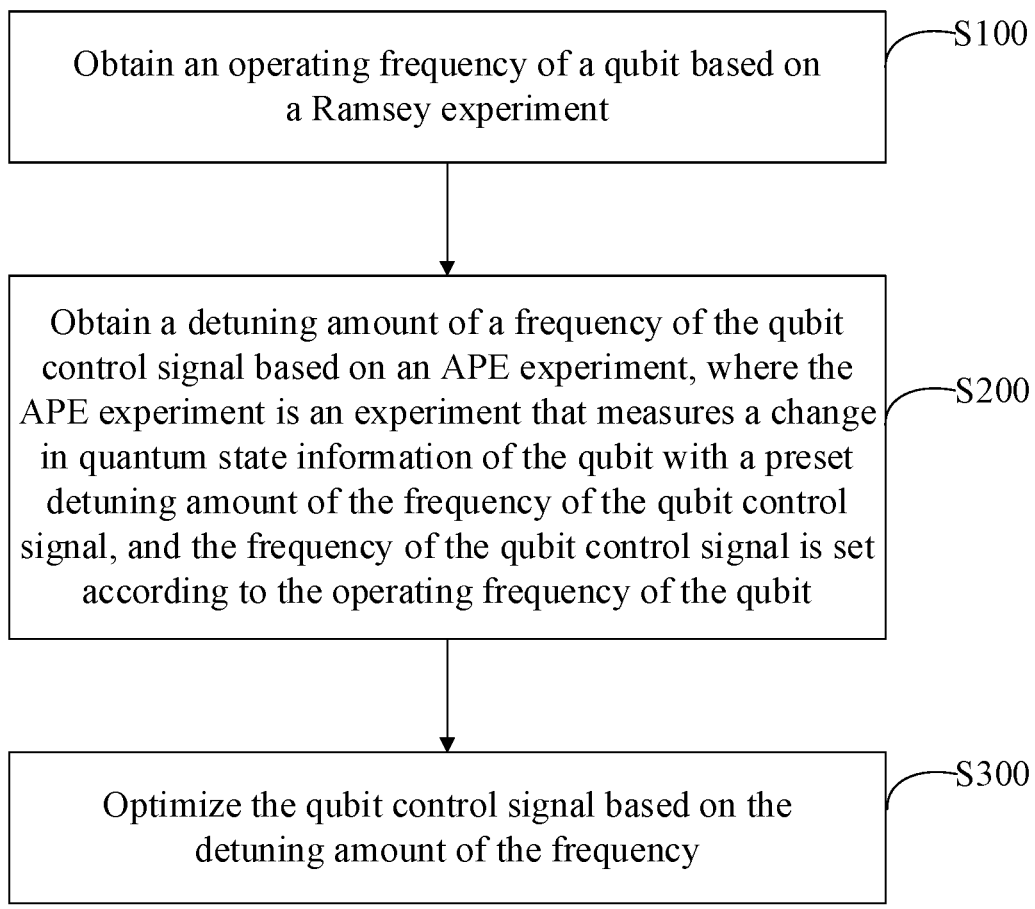
FIG. 1 is a flowchart of a method for optimizing a qubit control signal according to some embodiments of the present disclosure.

As shown in FIG. 1, embodiments of the present disclosure provide a method for optimizing a qubit control signal. The method includes the following steps.

In step S100, an operating frequency of a qubit is obtained based on a Ramsey experiment.

A qubit is a resonant system with a plurality of energy levels, and the resonant system is formed by a capacitance to ground and an inductive element based on a superconducting Josephson junction. There is a corresponding transition frequency and transition energy between any two energy levels of the resonant system. The value of the transition frequency is controlled by a magnetic flux modulation signal applied to the qubit. The magnetic flux modulation signal may be a DC voltage signal or a pulse signal. A frequency of the qubit includes a natural frequency and an operating frequency. The natural frequency is associated with physical properties of the superconducting Josephson junction and the capacitance to ground. When a circuit structure of a qubit on a quantum chip is formed, the natural frequency thereof is determined. However, when the qubit is operating, the natural frequency thereof may be selected as an operating frequency, or another frequency may be selected as the operating frequency. The operating frequency is controlled by the magnetic flux modulation signal. By applying a corresponding DC voltage signal or pulse signal, the qubit is at the operating frequency.

The quantum chip includes a plurality of qubits, and the operating frequency of each qubit is associated with the applied magnetic flux modulation signal. Inevitably, the magnetic flux modulation signals applied to the plurality of qubits may have mutual crosstalk effects. As a result, control accuracy of the magnetic flux modulation signal applied to each qubit over the operating frequency of the qubit may be affected.

The qubit control signal is a microwave control signal that provides transition energy for an energy level system of the qubit, that is, the microwave control signal controls a quantum state of the qubit. The microwave control signal achieves the control over the quantum state through microwave resonance with the energy level system. That is, a difference between a frequency of the microwave control signal and the operating frequency of the qubit may directly affect the microwave resonance and the control of the microwave control signal over the quantum state of the qubit. Therefore, when the qubit control signal is optimized, the operating frequency of the qubit needs to be calibrated first to prevent an influence of an error between the frequency of the qubit control signal and the operating frequency of the qubit on an optimization result of the qubit control signal.

In the field of quantum computing, the operating frequency of the qubit may be measured through the Ramsey experiment. Detail process of the Ramsey experiment will not be described again in embodiments of the present disclosure.

In step S200, a detuning amount of a frequency of the qubit control signal is obtained based on an APE experiment. The APE experiment is an experiment that measures the change in quantum state information of the qubit with (as a function of) a preset detuning amount of the frequency of the qubit control signal, and the frequency of the qubit control signal is set according to the operating frequency of the qubit.

The qubit control signal is used to control quantum state information of the qubit. When the frequency of the qubit control signal changes, the effect of microwave resonance between the qubit control signal and the qubit changes, causing the quantum state information of the qubit to change accordingly. After the operating frequency of the qubit is calibrated through the Ramsey experiment, a specific initial value may be determined for the frequency of the qubit control signal. For example, the initial value of the frequency of the qubit control signal may be equal to or similar to the operating frequency of the qubit. In some embodiments of the present disclosure, in order to achieve an optimal microwave resonance effect, the two frequencies are equal.

The detuning amount is preset by presetting the frequency of the qubit control signal. The detuning amount refers to a difference between the frequency of the qubit control signal to be applied to the qubit and the initial value. A plurality of differences are set, and different quantum state information of the qubit corresponding to different preset detuning amounts are measured and obtained by applying qubit control signals of frequencies corresponding to the plurality of differences to the qubits. Then, data regarding the change of the quantum state information of the qubit with the preset detuning amounts of the frequency of the qubit control signal is obtained. Moreover, the preset detuning amount corresponding to optimal fidelity of the quantum state information is obtained based on change amounts of the quantum state information obtained by the above measurement.

In step S300, the qubit control signal is optimized based on the detuning amount of the frequency.

For example, after the detuning amount of the frequency of the qubit control signal is obtained through the APE experiment, the initial value of the frequency of the qubit control signal may be corrected. In this way, when the qubit control signal at the corrected frequency is applied to the qubit, the fidelity of the quantum state information of the qubit is optimal, which improves accuracy of quantum computing on the qubit.

In the present disclosure, the operating frequency of the qubit is obtained based on the Ramsey experiment, the initial value of the frequency of the qubit control signal is determined, the detuning amount of the frequency of the qubit control signal is obtained based on the APE experiment, the detuning amount of the frequency of the qubit control signal corresponding to the most accurate quantum state information of the qubit is obtained based on results of the APE experiment, and the frequency of the qubit control signal is determined based on this detuning amount of the frequency, so that fidelity of the qubit control signal is greatly improved.

In some embodiments of the present disclosure, prior to the obtaining an operating frequency of a qubit based on a Ramsey experiment, the method further includes: updating a predetermined quantum state criterion, where the quantum state criterion is used to determine the quantum state information of the qubit.

For example, after the qubit control signal is applied to the qubit, quantum state information of the qubit is measured. A measurement process of the quantum state information is generally an IQ demodulation process in the field of quantum computing. That is, an analog signal carrying the quantum state information outputted by the quantum chip is sensed through a signal acquisition module, and the analog signal is IQ demodulated to obtain corresponding IQ coordinate point data. The IQ coordinate point data is coordinate points in an IQ coordinate system. The quantum state of the qubit is controlled to a ground state and an excited state by applying qubit control signals, and a plurality of IQ coordinate points are obtained through a large number of tests. A cluster when the qubit is at the ground state and a cluster when the qubit is at the excited state may be obtained by processing the plurality of coordinate point data on IQ coordinate system through a K-means clustering algorithm. The quantum state of the qubit can be effectively determined by setting an appropriate criterion, that is, the predetermined quantum state criterion.

When performance parameters of the qubit or parameters of the qubit control signal change or are affected by an environment, the control effect of the qubit control signal on the quantum state information of the qubit may also change. That is, the quantum state criterion needs to be updated in real time to ensure the optimal fidelity of the quantum state information obtained by measurement and to ensure that the detuning amount of the frequency of the optimized qubit control signal is more accurate.

Figure 2:
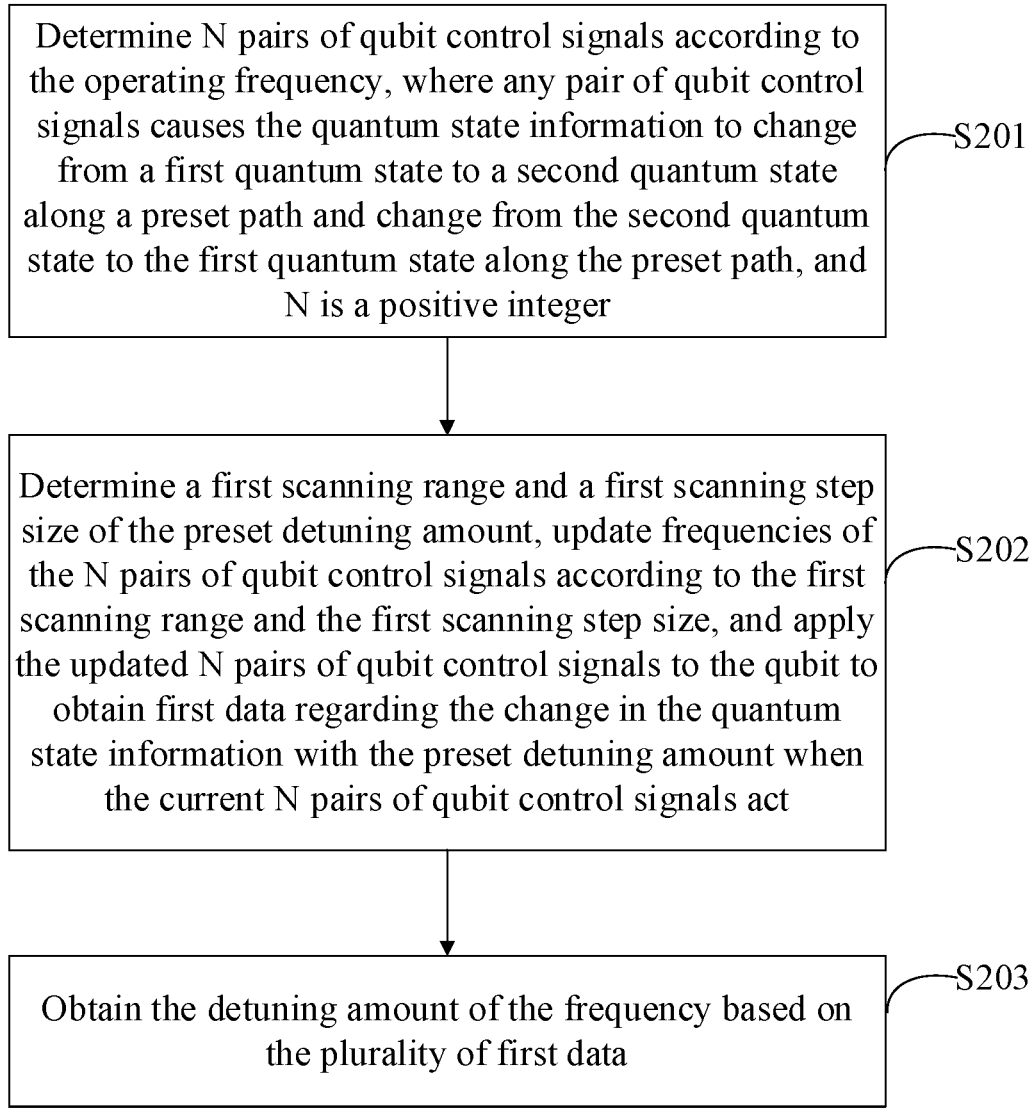
FIG. 2 is a flowchart of obtaining a detuning amount of a frequency based on an APE experiment according to some embodiments of the present disclosure.

As shown in FIG. 2, in some embodiments of the present disclosure, the obtaining a detuning amount of a frequency of the qubit control signal based on an APE experiment includes the following steps.

In step S201, N pairs of qubit control signals are determined according to the operating frequency, where any pair of qubit control signals causes the quantum state information to change from a first quantum state to a second quantum state along a preset path and change from the second quantum state to the first quantum state along the preset path, and N is a positive integer.

For example, when a single qubit control signal is applied to the qubit to control the quantum state information of the qubit, due to interference from other signals and environmental influences, an error occurs in the control effect of the qubit control signal. This error may be obtained by measuring the quantum state information of the corresponding qubit. However, when this error is small, it is difficult to measure the error through the quantum state information. That is, the qubit control signal cannot be optimized. The inventor of the present disclosure proposes the following method. When a control error of a single qubit control signal is very small and difficult to measure, a pair of qubit control signals is set and applied to the qubit as a combined control signal. Through setting of a plurality of pairs of qubit control signals, control errors are accumulated, and corresponding quantum state information is measured, so that the corresponding control error can be obtained, that is, the detuning amount of the frequency of the qubit control signal can be obtained. Therefore, N may be 1 or may be other positive integers greater than 1.

When N is a larger positive integer, it may be easier to measure an accumulation amount of the control errors. During a specific measurement, the inventor of the present disclosure finds that, when a larger number of pairs of qubit control signals are set, such as at least 5 pairs, the accumulation of the control errors obtained by measurement is more obvious, which is conducive to correcting the qubit control signal through the quantum state information.

In the field of quantum computing, a change in the quantum state information is generally represented by a Bloch Sphere. For example, a pair of qubit control signals in the present disclosure causes the quantum state to change from a first quantum state to a second quantum state along a preset path and then change from the second quantum state to the first quantum state along the preset path. Taking a pair of X-pulse qubit control signals as an example, the quantum state is caused to change from the ground state to the excited state in a clockwise direction around an X axis on the Bloch sphere and then change from the excited state to the ground state in a counterclockwise direction around the X axis. A rotation axis includes, but is not limited to, the X axis, which may also be a Y axis or an XY plane, as long as the quantum state information of the qubit can change around the rotation axis by a same angle along opposite directions on the Bloch sphere.

In step S202, a first scanning range and a first scanning step size of the preset detuning amount are determined, frequencies of the N pairs of qubit control signals are updated according to the first scanning range and the first scanning step size, and the updated N pairs of qubit control signals are applied to the qubit to obtain first data regarding the change in the quantum state information with (as a function of) the preset detuning amount when the current N pairs of qubit control signals act.

Prior to the optimization of the qubit control signal, a specific detuning amount of the frequency cannot be determined, and it needs to preset a frequency detuning range and set the qubit control signal based on a frequency within the preset range for experiments. Correspondingly, the first scanning range and the first scanning step size are set when the detuning amount is preset. Each time a first scanning step size is updated, the first scanning step size corresponds to a specific value of the preset detuning amount in the first scanning range. In this way, the N pairs of qubit control signals at corresponding frequencies are determined. The N pairs of qubit control signals with the frequencies updated based on the first scanning step size are applied to the qubit, so that the corresponding quantum state information can be obtained by measurement. A plurality of sets of first data may be obtained by updating the frequency of the qubit control signal within a preset first scanning range according to the first scanning step size and applying the updated qubit control signal to the qubit to obtain the corresponding quantum state information.

For example, as shown in FIG. 3, when N is 5, 6, and 7 respectively, 3 sets of first data of the quantum state information as a function of the preset detuning amount are obtained. Each set of data includes a value of the preset detuning amount and a value of the corresponding quantum state information.

In step S203, the detuning amount of the frequency is obtained based on the plurality of first data.

For example, the plurality of first data represents a change amount of the corresponding quantum state information as a function of the frequency of the qubit control signal that changes in the first scanning range according to the first scanning step size. The highest fidelity of quantum state information and the corresponding detuning amount of the frequency can be obtained by comparing a plurality of quantum state information.

Figure 4:
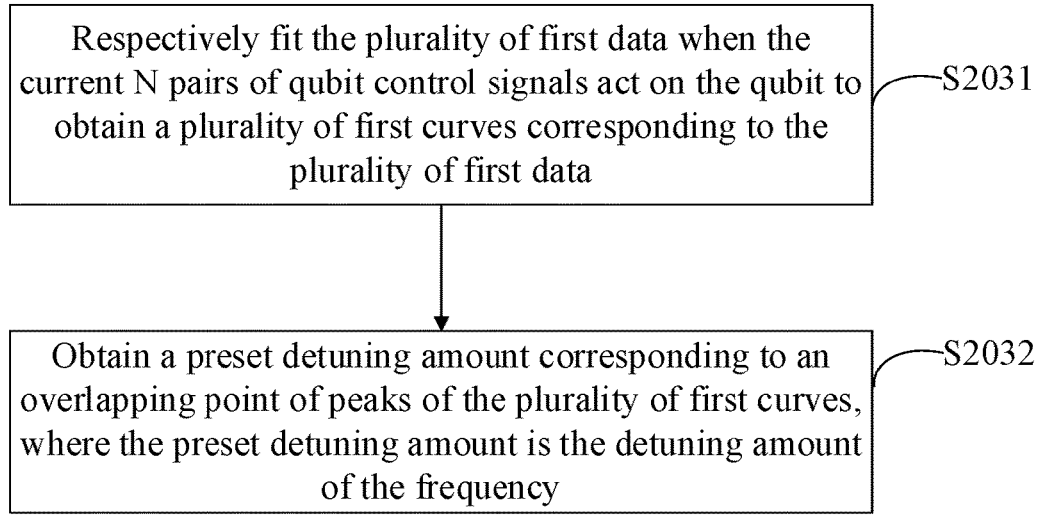
FIG. 4 is a flowchart of obtaining the detuning amount of the frequency based on a plurality of first data according to some embodiments of the present disclosure.

As shown in FIG. 4, in some embodiments of the present disclosure, the quantum state information is a probability that the qubit is in a ground state, and the obtaining the detuning amount of the frequency based on the plurality of first data includes the following steps.

In step S2031, the plurality of first data when the current N pairs of qubit control signals act on the qubit are respectively fit to obtain a plurality of first curves.

In step S2032, a preset detuning amount corresponding to an overlapping point of peaks of the plurality of first curves is obtained, and the preset detuning amount is determined as the detuning amount of the frequency.

Figure 5:
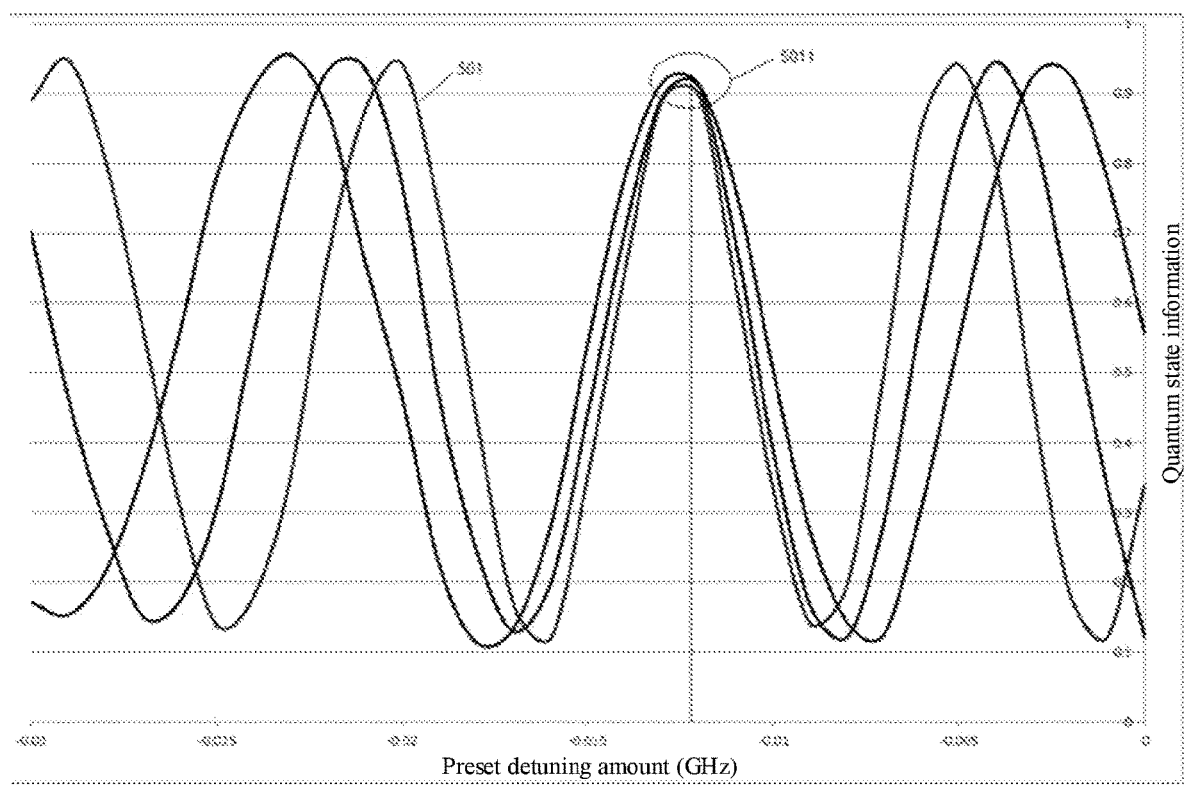
FIG. 5 is a schematic diagram of first curves obtained by fitting based on the plurality of first data according to some embodiments of the present disclosure.

Referring to FIG. 5 together, for example, each value of N corresponds to a set of first data regarding the change in the quantum state information as a function of the preset detuning amount of the qubit control signal. When the quantum state information is the probability that the qubit is in the ground state, the applied qubit control signal is used to adjust the quantum state of the qubit to be the ground state, a first curve 501 is obtained by fitting the first data. A preset detuning amount corresponding to a peak of the first curve 501 is selected as the detuning amount of the frequency. In this case, the fidelity of the quantum state information obtained by measurement is maximum.

When N is set to a plurality of values, a plurality of first curves 501 may be obtained by fitting. A preset detuning amount corresponding to an overlapping point 5011 of peaks of the plurality of first curves 501 is selected as the detuning amount of the frequency, which can ensure that the accumulated control errors of a plurality of pairs of qubit control signals correspond to a same frequency detuning amount for quantum state information and ensure that the control effect of the optimized qubit control signal is more accurate.

As shown in FIG. 7, in some other embodiments of the present disclosure, the quantum state information is a probability that the qubit is in a ground state, and the obtaining the detuning amount of the frequency based on the plurality of first data includes the following steps.

In step S2031, the plurality of first data when the current N pairs of qubit control signals act on the qubit are respectively fit to obtain a plurality of first curves.

In step S2033, a preset detuning amount corresponding to an overlapping point of troughs of the plurality of first curves is obtained, and the preset detuning amount is determined as the detuning amount of the frequency.

Referring to FIG. 6 together, for example, each value of N corresponds to a set of first data regarding the change in the quantum state information as a function of the preset detuning amount of the qubit control signal. When the quantum state information is the probability that the qubit is in the excited state, the applied qubit control signal is used to adjust the quantum state of the qubit to be the excited state, and a first curve 501 is obtained by fitting the first data. A preset detuning amount corresponding to a trough of the first curve 501 is selected as the detuning amount of the frequency. In this case, the fidelity of the quantum state information obtained by measurement is maximum.

When N is set to a plurality of values, a plurality of first curves 501 may be obtained by fitting. A preset detuning amount corresponding to an overlapping point 5012 of troughs of the plurality of first curves 501 is selected as the detuning amount of the frequency, which can ensure that the accumulated control errors of a plurality of pairs of qubit control signals correspond to a same frequency detuning amount for quantum state information and ensure that the control effect of the optimized qubit control signal is more accurate.

In some other embodiments of the present disclosure, the obtaining a detuning amount of a frequency of the qubit control signal based on an APE experiment further includes: updating the first scanning range of the preset detuning amount, where the updated first scanning range is smaller than the first scanning range prior to the updating.

When the first scanning range of the preset detuning amount is set, a specific detuning amount of the frequency cannot be specified. The specific detuning amount of the frequency is obtained through the APE experiment by setting a larger first scanning range. After the detuning amount of the frequency is preliminarily determined, the inventor of the present disclosure continues to perform scanning in a small range, that is, narrow the first scanning range of the preset detuning amount, so that the obtained detuning amount of the frequency is taken as a center frequency value of the updated first scanning range to conduct the APE experiment to complete fine scanning to obtain a more accurate detuning amount of the frequency. For example, the first scanning range of the preset detuning amount preliminarily determined is [0 MHz, 30 MHz], and the first scanning step size is 1 MHz. After the detuning amount of the frequency of 16 MHz is obtained through a plurality of APE experiments, the first scanning range is updated to [12 MHz, 20 MHz]. A plurality of APE experiments are conducted again to obtain the detuning amount of the frequency with the updated first scanning range, and the qubit control signal is determined based on the detuning amount of the frequency obtained from updated measurement, so that the optimization effect is better.

Figure 8:
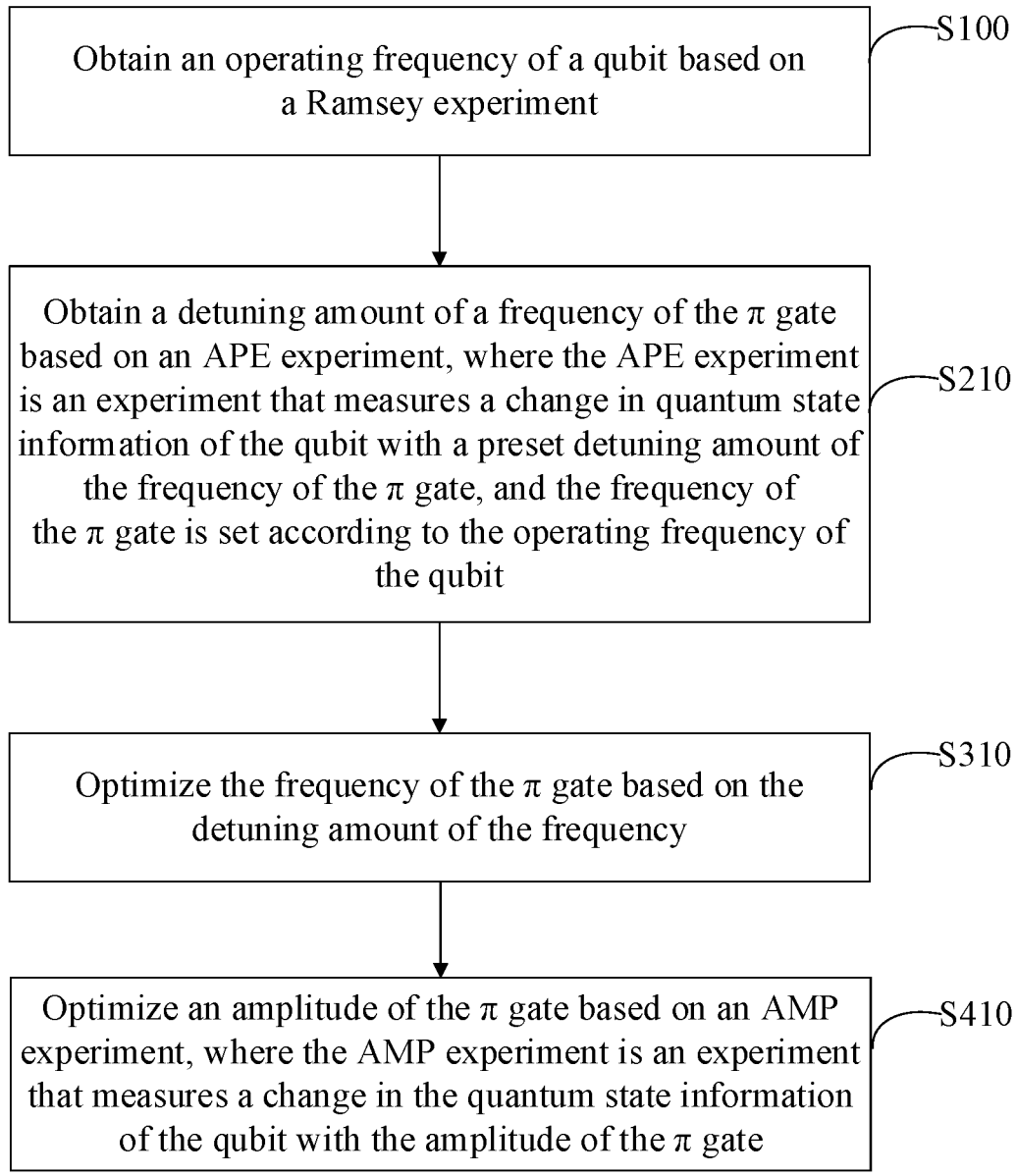
FIG. 8 is a flowchart of a method for optimizing a single-bit quantum logic gate according to some embodiments of the present disclosure.

As shown in FIG. 8, some embodiments of the present disclosure provide a method for optimizing a single-bit quantum logic gate. The single-bit quantum logic gate includes a 7C gate, and the method includes the following steps.

In step S110, an operating frequency of a qubit is obtained based on a Ramsey experiment.

In step S210, a detuning amount of a frequency of the $\pi$ gate is obtained based on an APE experiment, where the APE experiment is an experiment that measures a change in quantum state information of the qubit with a preset detuning amount of the frequency of the $\pi$ gate.

In step S310, the frequency of the $\pi$ gate is optimized based on the detuning amount of the frequency.

A quantum logic gate is a gate operation applied to a qubit to control quantum state information of the qubit, which is similar to a gate operation in classical computing. The quantum logic gate includes a single-bit quantum logic gate acting on a single qubit, a two-bit quantum logic gate acting on two qubits, and a multi-bit quantum logic gate acting on a plurality of qubits. In some embodiments of the present disclosure, the single-bit quantum logic gate is taken as an example. The single-bit quantum logic gate includes a $\pi$ gate, an H gate (Hadamard gate), and the like. A gate operation corresponding to the $\pi$ gate is to control the quantum state information of the qubit by rotating by 180 degrees along the X axis on the Bloch sphere, by which the quantum state information switches between the ground state and the excited state.

When the $\pi$ gate is optimized, the determining the qubit control signal based on the detuning amount of the frequency as described in steps S100 to S300 above requires calibrating the frequency of the $\pi$ gate. Firstly, an operating frequency of a qubit is obtained through a Ramsey experiment, and an initial value of a frequency of a qubit control signal corresponding to the $\pi$ gate is determined. A detuning amount of the frequency of the qubit control signal corresponding to the $\pi$ gate is obtained through an APE experiment, and then the frequency of the qubit control signal corresponding to the $\pi$ gate is determined based on the detuning amount of the frequency obtained through the APE experiment.

In step S410, an amplitude of the $\pi$ gate is optimized based on an AMP experiment, where the AMP experiment is an experiment that measures a change in the quantum state information of the qubit as a function of the amplitude of the $\pi$ gate.

After the optimization of the frequency of the qubit control signal corresponding to the $\pi$ gate, there is also a need to determine an amplitude of the qubit control signal corresponding to the $\pi$ gate, for example, through the AMP experiment. The AMP experiment is an experiment that measures a change in the quantum state information of the qubit with the amplitude of the $\pi$ gate. During the experiment, the amplitude of the qubit control signal corresponding to the $\pi$ gate is preset to a plurality of parameters and applied to the qubit to measure the corresponding quantum state information. Based on measurement results of the quantum state information, an amplitude parameter corresponding to the highest fidelity of the quantum state information is selected as the amplitude of the qubit control signal corresponding to the $\pi$ gate, and an optimal amplitude of the $\pi$ gate is obtained.

Figure 9:
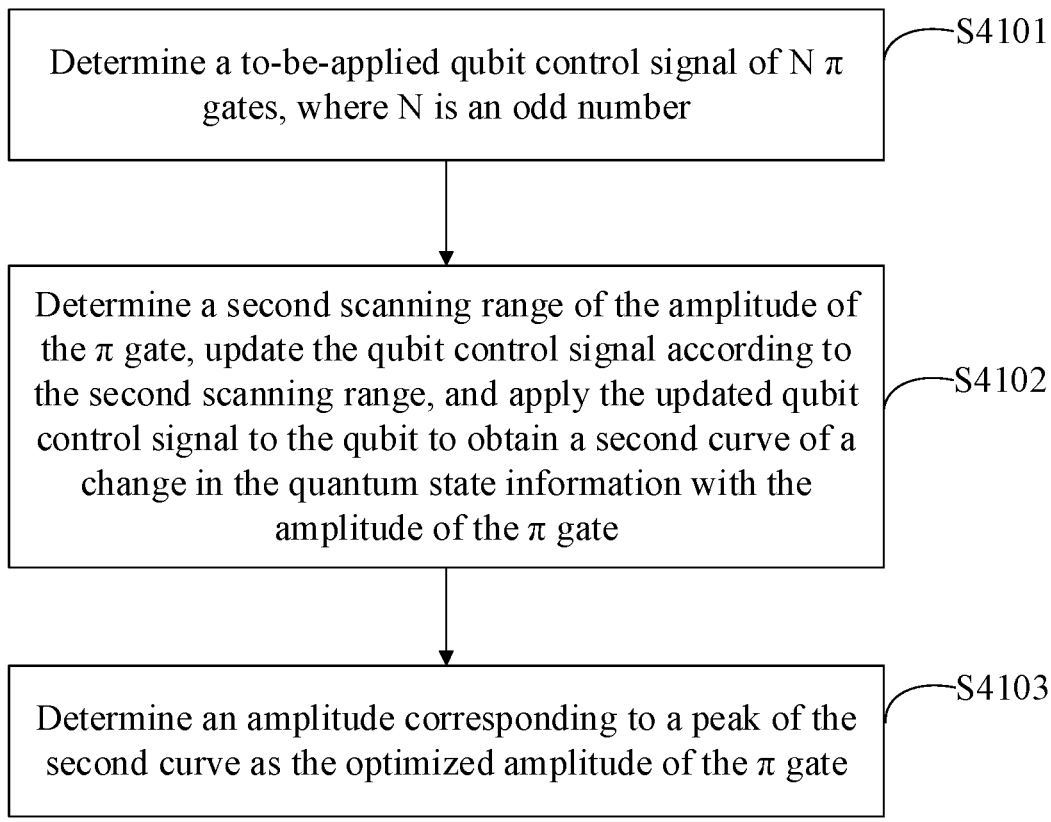
FIG. 9 is a flowchart of a method for optimizing an amplitude of a π gate based on an APE experiment according to some embodiments of the present disclosure.

As shown in FIG. 9, in some embodiments of the present disclosure, the determining an amplitude of the $\pi$ gate based on an APE experiment includes the following steps.

In step 4101, a to-be-applied qubit control signal including N $\pi$ gates is determined, where N is an odd number.

When each $\pi$ gate is applied to the qubit to control the quantum state information of the qubit, due to interference from other signals and environmental influences, an error occurs in the control effect of the qubit control signal. Through the setting of the qubit control signal of a plurality of N $\pi$ gates, control errors are accumulated and the corresponding quantum state information is measured. That is, the corresponding control error can be obtained, i.e., a detuning amount of the amplitude of the $\pi$ gate. For example, N may be set to a plurality of odd numbers such as 3, 5, and 7.

In step 4102, a second scanning range of the amplitude of the $\pi$ gate is determined, the qubit control signal is updated according to the second scanning range, and the updated qubit control signal is applied to the qubit to obtain a second curve regarding a change in the quantum state information as a function of the amplitude of the $\pi$ gate.

When the detuning amount of the amplitude of the $\pi$ gate is preset, the second scanning range and a second scanning step size are set. Each time a second scanning step size is updated, the second scanning step size corresponds to a specific value of the detuning amount of the amplitude in the second scanning range, and then the qubit control signal of N $\pi$ gates with the corresponding amplitude is determined. The qubit control signal of N $\pi$ gates with the amplitude updated based on the second scanning step size is applied to the qubit, so that the corresponding quantum state information can be obtained by measurement. A plurality of sets of second data may be obtained by updating the amplitude of the qubit control signal of N 7C gates within a preset second scanning range according to the second scanning step size and applying the updated qubit control signal to the qubit to obtain the corresponding quantum state information. A plurality of second curves of the quantum state information changing with an amplitude of a single $\pi$ gate may be obtained by fitting the plurality of sets of second data.

In step 4103, an amplitude corresponding to a peak of the second curve is determined as the optimized amplitude of the π gate.

For example, each value of N corresponds to a set of second data of the quantum state information changing with the detuning amount of the amplitude of the qubit control signal. When the quantum state information is the probability that the qubit is in the ground state, the applied qubit control signal is used to adjust the quantum state of the qubit to the ground state, and a second curve is obtained by fitting the second data. A preset detuning amount corresponding to a peak of the second curve is selected as the detuning amount of the amplitude. In this case, the fidelity of the quantum state information obtained by measurement is maximum.

Figure 10:
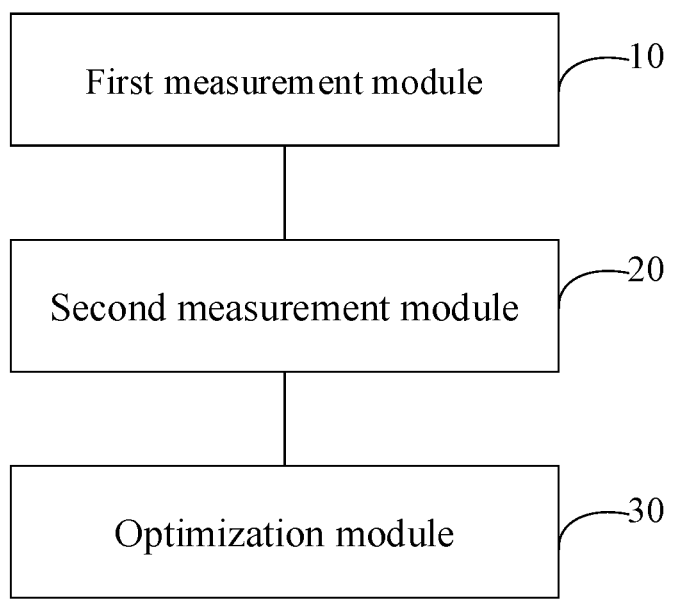
FIG. 10 shows an apparatus for optimizing a qubit control signal according to some embodiments of the present disclosure.

As shown in FIG. 10, based on a same application concept, some embodiments of the present disclosure provide an apparatus for optimizing a qubit control signal, including: a first measurement module 10, a second measurement module 20, and an optimization module 30.

The first measurement module 10 is configured to obtain an operating frequency of a qubit based on a Ramsey experiment.

The second measurement module 20 is configured to obtain a detuning amount of a frequency of the qubit control signal based on an APE experiment, where the APE experiment is an experiment that measures a change in quantum state information of the qubit with a preset detuning amount of the frequency of the qubit control signal, and the frequency of the qubit control signal is set according to the operating frequency of the qubit.

The optimization module 30 is configured to optimize the qubit control signal based on the detuning amount of the frequency.

Based on a same application concept, some embodiments of the present disclosure provide a quantum computer. The qubit control signal of the quantum computer is optimized using the above method for optimizing a qubit control signal, or the quantum computer includes the above apparatus for optimizing a qubit control signal.

Compared with the related art, the method in the present disclosure includes: obtaining an operating frequency of a qubit based on a Ramsey experiment; obtaining a detuning amount of a frequency of the qubit control signal based on an APE experiment, where the APE experiment is an experiment that measures a change in quantum state information of the qubit with a preset detuning amount of the frequency of the qubit control signal; obtaining a detuning amount of the frequency of the qubit control signal corresponding to the most accurate quantum state information of the qubit through a result of the APE experiment, and optimizing the frequency of the qubit control signal based on the detuning amount of the frequency, so that fidelity of the qubit control signal is greatly improved.

It should be understood that "some embodiments", "one embodiment", or "an embodiment" mentioned throughout the specification does not mean that particular features, structures, or characteristics related to the embodiment(s) are included in at least one embodiment of the present disclosure. Therefore, "in some embodiments", "in one embodiment", or "in an embodiment" appearing throughout the specification does not refer to a same embodiment. In addition, these particular features, structures, or characteristics may be combined in one or more embodiments in any appropriate manner.

It is to be noted that herein, the term such as "comprise", "include", or any variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

In the several embodiments provided in the present disclosure, it should be understood that the disclosed method, apparatus, and system may be implemented in other manners. The embodiments described above are only examples. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or connections may be implemented using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated units may be implemented in a form of hardware, or may be implemented in a form of hardware plus software functional units.

Those of ordinary skill in the art can understand that all or some steps for implementing the foregoing method embodiments may be completed by a program instructing related hardware, the foregoing program may be stored in a computer-readable storage medium, and when executed, the program performs steps including the foregoing method embodiments. The foregoing storage medium includes: any medium that can store program code, such as a removable storage device, a read-only memory 13 (ROM), a magnetic disk, or a compact disc.

Alternatively, in the present disclosure, the integrated units may be stored in a computer-readable storage medium when implemented in the form of software functional units and sold or used as separate products. Based on such understanding, the technical solutions in the embodiments of the present disclosure essentially, or the part contributing to the related art may be implemented in a form of a software product. The computer software product is stored in a storage medium, and includes several instructions for instructing a device that implements resource changes (which may be a computer, a server, or the like) to perform all or part of the methods described in the embodiments of the present disclosure. The foregoing storage medium includes: any medium that can store program code, such as a removable storage device, a random access memory (RAM), a magnetic disk, or a compact disc.

The above are only some embodiments of the present disclosure, but the protection scope of the present disclosure is not limited thereto. Any changes made in accordance with the conception of the present disclosure, or equivalent embodiments modified as equivalent changes, which still do not exceed the spirit covered by the specification and the drawings, shall fall within the protection scope of the present disclosure.

What is claimed is:

1. A method for optimizing a qubit control signal, comprising:
obtaining an operating frequency of a qubit based on a Ramsey experiment;
obtaining a detuning amount of a frequency of the qubit control signal based on an amplified phase error (APE) experiment, wherein the APE experiment is an experiment that measures a change in quantum state information of the qubit with a preset detuning amount of the frequency of the qubit control signal, and the frequency of the qubit control signal is set according to the operating frequency of the qubit; and
determining the qubit control signal based on the detuning amount of the frequency.

2. The method according to claim 1, wherein, prior to the obtaining an operating frequency of a qubit based on a Ramsey experiment, the method further comprises: updating a predetermined quantum state criterion, wherein the quantum state criterion is used to determine the quantum state information of the qubit.

3. The method according to claim 1, wherein the obtaining a detuning amount of a frequency of the qubit control signal based on an APE experiment comprises:
determining N pairs of qubit control signals according to the operating frequency, wherein any pair of qubit control signals causes the quantum state information to change from a first quantum state to a second quantum state along a preset path and change from the second quantum state to the first quantum state along the preset path, and N is a positive integer;
determining a first scanning range and a first scanning step size of the preset detuning amount, updating frequencies of the N pairs of qubit control signals according to the first scanning range and the first scanning step size, and applying the updated N pairs of qubit control signals to the qubit to obtain a plurality of first data regarding the change in the quantum state information with the preset detuning amount when the current N pairs of qubit control signals act; and
obtaining the detuning amount of the frequency based on the plurality of first data.

4. The method according to claim 3, wherein the quantum state information is a probability that the qubit is in a ground state, and the obtaining the detuning amount of the frequency based on the plurality of first data comprises:
respectively fitting the plurality of first data when the current N pairs of qubit control signals act on the qubit to obtain a plurality of first curves; and
obtaining a preset detuning amount corresponding to an overlapping point of peaks of the plurality of first curves, wherein the preset detuning amount is the detuning amount of the frequency.

5. The method according to claim 4, wherein the obtaining a detuning amount of a frequency of the qubit control signal based on an APE experiment further comprises:
updating the first scanning range of the preset detuning amount, wherein the updated first scanning range is smaller than the first scanning range prior to the updating.

6. The method according to claim 3, wherein the quantum state information is a probability that the qubit is in an excited state, and the obtaining the detuning amount of the frequency based on the plurality of first data comprises:
respectively fitting the plurality of first data when the current N pairs of qubit control signals act on the qubit to obtain a plurality of first curves; and
obtaining a preset detuning amount corresponding to an overlapping point of troughs of the plurality of first curves, wherein the preset detuning amount is the detuning amount of the frequency.

7. The method according to claim 6, wherein the obtaining a detuning amount of a frequency of the qubit control signal based on an APE experiment further comprises:
updating the first scanning range of the preset detuning amount, wherein the updated first scanning range is smaller than the first scanning range prior to the updating.

8. A method for optimizing a single-bit quantum logic gate, wherein the single-bit quantum logic gate comprises a $\pi$ gate, and the method comprises:
obtaining an operating frequency of a qubit based on a Ramsey experiment;
obtaining a detuning amount of a frequency of the $\pi$ gate based on an APE experiment, wherein the APE experiment is an experiment that measures a change in quantum state information of the qubit with a preset detuning amount of the frequency of the $\pi$ gate, and the frequency of the $\pi$ gate is set according to the operating frequency of the qubit;
optimizing the frequency of the $\pi$ gate based on the detuning amount of the frequency; and
optimizing an amplitude of the $\pi$ gate based on an amplification (AMP) experiment, wherein the AMP experiment is an experiment that measures a change in the quantum state information of the qubit with the amplitude of the $\pi$ gate.

9. The method according to claim 8, wherein the optimizing an amplitude of the $\pi$ gate based on an AMP experiment comprises:
determining a to-be-applied qubit control signal of N $\pi$ gates, where N is an odd number;
determining a second scanning range of the amplitude of the $\pi$ gate, updating the qubit control signal according to the second scanning range, and applying the updated qubit control signal to the qubit to obtain a second curve of a change in the quantum state information with the amplitude of the $\pi$ gate; and
determining an amplitude corresponding to a peak of the second curve as the optimized amplitude of the $\pi$ gate.

10. An apparatus for optimizing a qubit control signal, comprising:
a first measurement module configured to obtain an operating frequency of a qubit based on a Ramsey experiment;
a second measurement module configured to obtain a detuning amount of a frequency of the qubit control signal based on an APE experiment, wherein the APE experiment is an experiment that measures a change in quantum state information of the qubit with a preset detuning amount of the frequency of the qubit control signal, and the frequency of the qubit control signal is set according to the operating frequency of the qubit; and
an optimization module configured to optimize the qubit control signal based on the detuning amount of the frequency.

11. A quantum computer, comprising the apparatus for optimizing a qubit control signal according to claim 10.

* * * * *